(12) United States Patent
Coulon et al.

(10) Patent No.: US 7,680,261 B2
(45) Date of Patent: Mar. 16, 2010

(54) METHOD OF PROVIDING AN IMPROVED CALL FORWARDING SERVICE

(75) Inventors: Stephane Coulon, Arronville (FR); Jean-Francois Rey, Brest (FR); Jacques Litteaut, Marly le Roy (FR)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 12/201,361

(22) Filed: Aug. 29, 2008

(65) Prior Publication Data
US 2009/0067607 A1 Mar. 12, 2009

(30) Foreign Application Priority Data
Sep. 11, 2007 (EP) ................... 07291086

(51) Int. Cl.
*H04M 3/46* (2006.01)
(52) U.S. Cl. ................................. 379/211.03
(58) Field of Classification Search ............ 379/211.02, 379/211.03
See application file for complete search history.

(56) References Cited
U.S. PATENT DOCUMENTS
6,917,673 B2 * 7/2005 Sawada et al. ......... 379/201.02
2004/0005045 A1 1/2004 Adams

FOREIGN PATENT DOCUMENTS
DE 10062024 C1 4/2002
EP 0841796 A2 5/1998

OTHER PUBLICATIONS
Cisco Systems: "Cisco Call Manager Administration guide"[Online] No. 3.3(2), 2002, XP002470898.
Anonymous: "Beschreibung der Leistungsmerkmale", HICOM. Beschreibung Der Leistungsmerkmale, No. A30951-A1000,-Ver0-1, Nov. 1995, pp. 3-33, XP002338794.
David J. Y. Lee, Institute of Electrical and Electronics Engineers, "IP voice mail", VTC Spring 2002. IEEE 55TH Vehicular Technology Conference. Proceedings. Birmingham, AL, May 6-9, 2002, IEEE , vol. 1 of 4, Conf. 55, May 6, 2002, pp. 1805-1808.
* cited by examiner

*Primary Examiner*—Harry S Hong
(74) *Attorney, Agent, or Firm*—Fay Sharpe LLP

(57) ABSTRACT

The invention concerns a method of providing an improved call forwarding service in a telecommunications network, and a network unit and a computer program product to execute this method. A call initiated by a caller (10) to a first callee (21) is consecutively forwarded, starting from the first callee (21), to one or more further interlinked callees (22, 23), thereby forming a call forwarding chain (401, 402). A set of data is added to the call, the data comprising an identifier of each of the callees (21, 22, 23) involved in the call forwarding chain (401, 402) and an address associated with a respective message memory (210, 220, 230) assigned to each of the callees (21, 22, 23) involved in the call forwarding chain (401, 402). When the call is forwarded to the message memory (230) assigned to a last callee (23) of the call forwarding chain (401, 402), the caller (10) is prompted to provide a message to be stored in one or more of the message memories (210, 220, 230). From the set of data one or more of the addresses associated with the message memories (210, 220, 230) are retrieved. And the message received from the caller (10) is delivered to one or more of the message memories (210, 220, 230) by routing the message to the retrieved one or more addresses.

20 Claims, 4 Drawing Sheets

METHOD OF PROVIDING AN IMPROVED CALL FORWARDING SERVICE

The invention is based on a priority application EP 07 291 086.2 which is hereby incorporated by reference.

TECHNICAL FIELD

The present invention relates to a method of providing an improved call forwarding service in a telecommunications network, and a network unit and a computer program product to execute said method.

BACKGROUND OF THE INVENTION

In current telecommunications systems, a subscriber who has activated an automatic call forwarding to his voice mailbox is the only one who may access a voice message left by a caller in the mailbox. If a caller is forwarded by a call forwarding service activated by a callee to a third party callee, and forwarded again by a call forwarding service activated by the third party callee to a forth party callee, thus forming a call forwarding chain, the caller may leave a message only in the mailbox of the forth party callee. Thus, the precedent callees of the call forwarding chain, especially the first callee where the call actually was destined to, will not be able to access the message left by the caller and retrieve the information contained.

US 2004/0005045 A1 describes call forwarding services in an Advanced Intelligent Network (=AIN). A subscriber connected to a communications network, including the Internet and other packet switched type data networks, is enabled to customize and execute the call forwarding services, with near real-time access to the service data. That prior art concerns only the subscriber's setting of the call forwarding, not a caller encountering interlinked call forwarding after dialing a callee's number.

SUMMARY OF THE INVENTION

It is the object of the present invention to provide an improved method of call forwarding.

The object of the present invention is achieved by a method of providing an improved call forwarding service in a telecommunications network, wherein a call initiated by a caller to a first callee is consecutively forwarded, starting from the first callee, to one or more further interlinked callees, thereby forming a call forwarding chain, wherein the method comprises the steps of adding a set of data to the call, the data comprising an identifier of each of the callees involved in the call forwarding chain and an address associated with a respective message memory assigned to each of the callees involved in the call forwarding chain, prompting, when the call is forwarded to the message memory assigned to a last callee of the call forwarding chain, the caller to provide a message to be stored in one or more of the message memories, retrieving from the set of data one or more of the addresses associated with the message memories, and delivering the message received from the caller to one or more of the message memories by routing the message to the retrieved one or more addresses. Furthermore, the object of the present invention is achieved by a network entity for providing an improved call forwarding service in a telecommunications network, wherein a call initiated by a caller to a first callee is consecutively forwarded, starting from the first callee, to one or more further interlinked callees, thereby forming a call forwarding chain, wherein the network entity comprises a control unit adapted to add a data set to the call, the data comprising an identifier of each of the callees involved in the call forwarding chain and an address associated with a respective message memory assigned to each of the callees involved in the call forwarding chain, prompt, when the call is forwarded to the message memory assigned to a last callee of the call forwarding chain, the caller to provide a message to be stored in one or more of the message memories, retrieve from the data set one or more of the addresses associated with the message memories, and deliver the message received from the caller to one or more of the message memories by routing the message to the retrieved one or more addresses. And the object of the present invention is achieved by a computer program product providing an improved call forwarding service in a telecommunications network, wherein a call initiated by a caller to a first callee is consecutively forwarded, starting from the first callee, to one or more further interlinked callees, thereby forming a call forwarding chain, wherein the computer program product, when executed by a network entity, performs the steps of adding a set of data to the call, the data comprising an identifier of each of the callees involved in the call forwarding chain and an address associated with a respective message memory assigned to each of the callees involved in the call forwarding chain, prompting, when the call is forwarded to the message memory assigned to a last callee of the call forwarding chain, the caller to provide a message to be stored in one or more of the message memories, retrieving from the set of data one or more of the addresses associated with the message memories, and delivering the message received from the caller to one or more of the message memories by routing the message to the retrieved one or more addresses.

Generally, the invention improves the reachability of a callee.

The invention allows a caller faced with a call forwarding chain to have his message delivered not only to the last callee of the call forwarding chain but also to one or more other callees of the call forwarding chain.

The proposed invention enables precedent callees of the call forwarding chain, especially the first callee where the call actually was destined to, to access the message left by the caller and retrieve the information contained therein.

As the first callee is the person who was originally destined to receive the call, the present invention helps to re-establish the intended path of call information distribution even in case of a call forwarding chain.

Further advantages are achieved by the embodiments of the invention indicated by the dependent claims.

According to a preferred embodiment of the invention, one of the one or more callees specifies a preference with respect to the handling of the call. It is possible that said one callee provides the preference to a multimedia messaging service (=MMS) controlling the automatic call forwarding of said callee. The MMS translates the preference into a corresponding instruction that is to be executed in case of a call forwarding. For example, before activating the call forwarding service, the first callee starts an application (local or central) where the first callee is presented a select list. The first callee selects from the select list a pre-defined preference that best suits his wishes. The callee's preference selection is stored in a memory as a call forwarding preference associated with the first callee. The selected preference is taken into consideration for the operation of the call forwarding.

When the call arrives at the first callee, the callee's call forwarding is added to the data set appended to the call message. After the call is forwarded to the message memory assigned to a last callee of the call forwarding chain, the data set appended to the call is checked whether it contains a call forwarding preference. The further operation of the call is performed in conformity with the contained call forwarding preference. It is possible that a call forwarding application associated with the last callee analyses call and extracts a call forwarding preference contained within the data set appended to the call message. Then, the call forwarding application follows the instructions corresponding to the call forwarding preference.

According to another preferred embodiment of the invention, the first callee's preference specifies that the message provided by the caller is stored in the message memory assigned to the first callee without being distributed to any of the one or more further callees or to any message memory assigned to the one or more further callees. The callee's preference data is stored in a memory as a call forwarding preference associated with the first callee. After the call is forwarded to the message memory assigned to said last callee, an indication is made to the caller that instructs the caller to provide a message to be stored in the message memory assigned to the first callee. The address associated with the message memory assigned to the first callee is retrieved from the data set added to the call message. Using the retrieved address as destination address, the message received from the caller is routed to the message memory assigned to the first callee.

This embodiment of the invention allows a first callee to access information intended for him without wasting time, even when using a call forwarding service. Let us suppose that the first callee forwards his calls to his colleague because the first callee is in a meeting for some time. The colleague however unexpectedly had to leave the office ahead of schedule. So calls arriving at the colleague's terminal are call forwarded to the colleague's mailbox. Since the colleague will not return to the office before the next morning, the first callee would not find out about the left message before the next day. The present embodiment of the invention allows a first callee to define that a call be re-routed to his own mailbox if the call would be forwarded to a mailbox at the end of a call forwarding chain. So the first callee can access his mailbox when he returns from the meeting.

According to another preferred embodiment of the invention, a selection procedure for selection of one or more of the one or more callees is executed by then improved call forwarding service, whereby a select list presented in the selection procedure comprises the identifiers of each of the callees involved in the call forwarding chain. This selection procedure may be performed by a call forwarding server associated with the last callee in the call forwarding chain. The caller selects a selection of one or more callees of the one or more callees involved in the call forwarding chain. The caller's selection is transmitted to a control unit controlling the improved call forwarding service. Based on the received selection, the addresses associated with the message memories assigned to the selected one or more callees are retrieved from the data set. By utilizing the retrieved addresses as destination addresses, it is possible to distribute the message received from the caller to the one or more message memories assigned to the selected one or more callees.

The present embodiment allows a caller to choose by himself where to distribute his message. A caller may have the impression that his call does not receive due attention if his call is forwarded and, at the end of the call forwarding chain, his message is stored in a message memory of the last callee. So, the caller is given the opportunity to scatter his message to more than one message memory, and even to choose to which message memories.

In a preferred embodiment, a notification is delivered to the one or more of the message memories where the message has not been delivered to. It is possible that this notification indicates that a message has been delivered. It is also possible that the notification indicates further information associated with the course of the call forwarding of the call, e.g., the callees involved in the call forwarding chain, the message memories where the caller's message has been delivered, etc. This allows a timely distribution of call information to all callees involved in the call forwarding chain, partly by leaving the caller's message in message memories and partly by leaving a notification about the caller's message in message memories.

According to another preferred embodiment of the invention, the notification may be based on the VPIM or the IMAP (VPIM=Voice Profile for Internet Mail, IMAP=Internet Message Access Protocol).

Preferably, all the addresses associated with the message memories are retrieved from the data set. Then, the caller's message received from the caller is transmitted to all message memories associated with the callees involved in the call forwarding chain by routing the message to all the retrieved addresses.

Preferably, the data set is added to the call by encapsulating an Extensible Mark-up Language (=XML) script. This XML script contains a list (e.g., identifiers, names, etc.) of all reached callees, i.e., of the callees involved in the call forwarding chain. Preferably, this XML script also contains an address associated with a respective message memory assigned to each of the callees involved in the call forwarding chain. For example, this address may be an address of the callees' respective Multimedia Messaging Service (=MMS). The XML script may also contain a preference of one or more of the callees.

The function of the network entity (=mailbox) receiving the forwarded call message must consider several cases:

a) The script is not present in the call message. Then, no further action is to be taken. The function of the mailbox is as today.

b) The script is present in the call message. Then, at least one forwarding callee is listed;
- b1) If the mailbox has the capability or is set to propose a selection of destinations for the message, the mailbox proposes to the caller a set of alternatives where to deliver the message (only first callee, first callee and second callee, only second callee, . . . ).
- b2) The mailbox delivers the caller's message to all forwarding callees in the list.

BRIEF DESCRIPTION OF THE DRAWINGS

These as well as further features and advantages of the invention will be better appreciated by reading the following detailed description of presently preferred exemplary embodiments taken in conjunction with accompanying drawings of which.

DETAILED DESCRIPTION OF PREFERRED EMBODIMENTS

Figure 1:
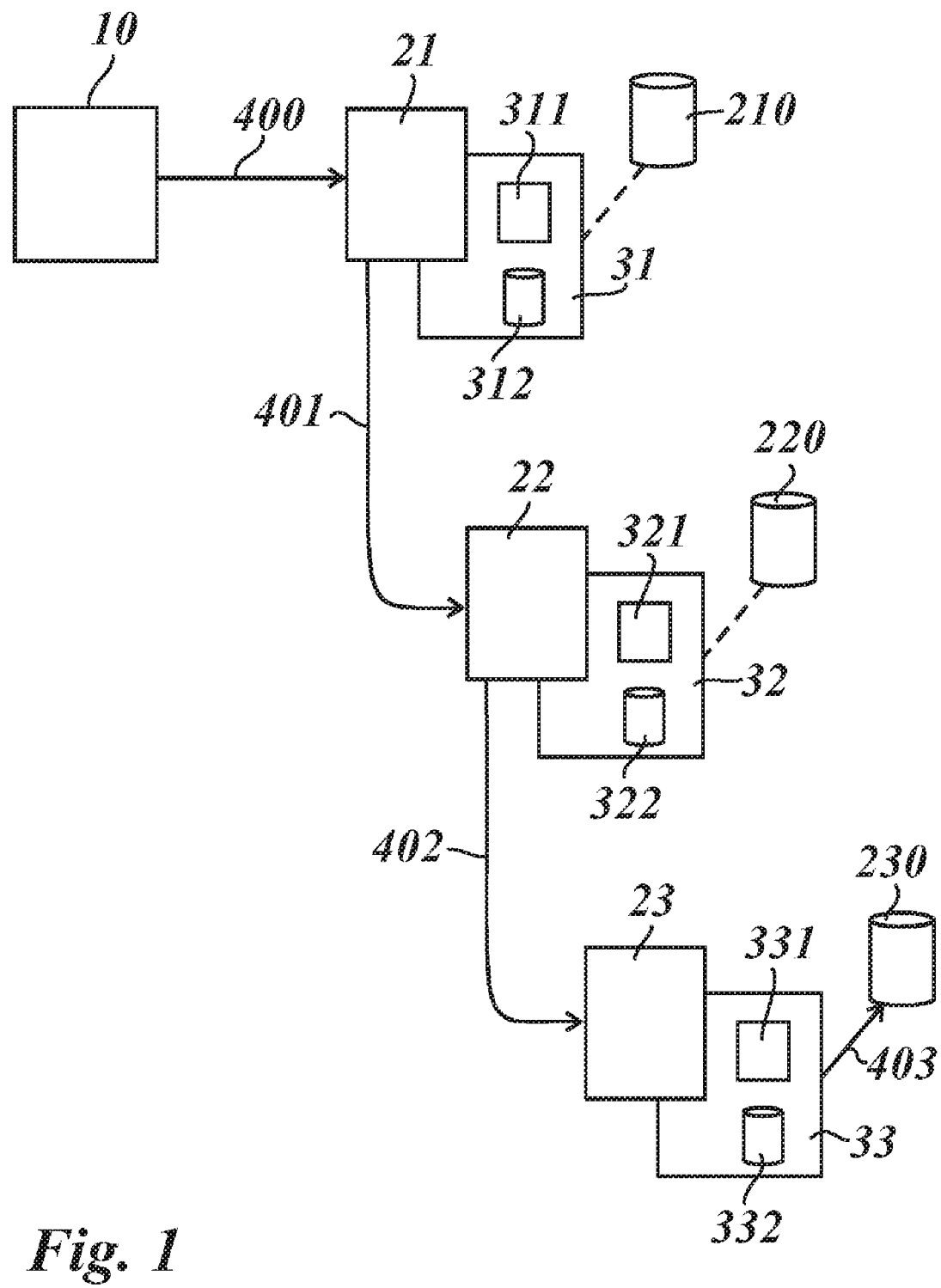
FIG. 1 is a block diagram of a call forwarding chain according to an embodiment of the invention.

FIG. 1 shows four subscribers 10, 21, 22, 23 of a wireline and/or wireless telecommunications network, e.g., a PSTN or an ISDN network or a GSM network (PSTN=Public Switched Telephone Network; ISDN=Integrated Services Digital Network; GSM=Global System for Mobile Communication). It is also possible that the telecommunications network is a packet-based network, e.g., the Internet. The four subscribers 10, 21, 22, 23 play the roles of a caller 10 initiating a telephone call, a first callee 21 receiving the caller's call first, a second callee 22 receiving the caller's call second, and a third callee 23 receiving the caller's call third.

In the following, when referring to a caller and a callee, it is implied that the caller and the callee each use terminals to send and receive telephone signals without explicitly referring to these terminals. So, the terms "caller/callee" and "terminal associated with/used by a caller/callee" may be used interchangeably. The terminals used by the caller 10 and the callees 21, 22, 23 may be wireline telephone terminal (POTS telephone set, ISDN terminal) or wireless terminals (DECT telephone set, cellular phone, PDA) (POTS=Plain Old Telephone System; DECT=Digital Enhanced Cordless Telecommunications; PDA=Personal Digital Assistant). It is also possible that the terminals are IP softphones run by a computer application (IP=Internet Protocol).

The first callee 21 is connected to a call management system 31 (=mailbox) with a control unit 311 and a software memory 312 and comprising a message memory 210. The first callee 21 has activated a call forwarding of incoming calls to a second callee 22. The second callee 22 is connected to a call management system 32 with a control unit 321 and a software memory 322 and comprising a message memory 220. The second callee 22 has activated a call forwarding of incoming calls to a third callee 23. The third callee 23 is connected to a call management system 33 with a control unit 331 and a software memory 332 and comprising a message memory 230. The third callee 23 has activated a call forwarding of incoming calls to his message memory 230. Thus, the three callees 21, 22, 23 form a call forwarding chain.

Each of the call management systems 32, 32, 33 is composed of one or several interlinked computers, i.e., a hardware platform, a software platform basing on the hardware platform and several application programs executed by the system platform formed by the software and hardware platform. The functionalities of the call management systems 32, 32, 33 are provided by the execution of these application programs. The application programs or a selected part of these application programs constitute a computer software product providing a call forwarding service as described in the following, when executed on the system platform. Further, such computer software product is constituted by a storage medium storing these application programs or said selected part of application programs.

The call management systems 32, 32, 33 may be implemented as tangible auxiliary units (physical mailbox) put beside and connected to the terminals of the users 21, 22, 23. For example, the call management systems 32, 32, 33 are mailbox units which are connected to the terminals and which comprise voice recording memories. As the call management systems 32, 32, 33 are connected to the terminals, they are part of the telecommunications network and represent network units. For example, the call management systems 32, 32, 33 are represented by a multimedia messaging service (=MMS).

It is also possible that the call management systems 32, 32, 33 are not physically visible to the users 21, 22, 23 but are "hidden" as call management functions within the network (electronic/network mailbox). For example, the call management systems 32, 32, 33 are implemented by software applications running on a call management server located in the telecommunications network.

The name of the caller 10 may be "Peter", the name of the first callee 21 may be "Alice", the name of the second callee 22 may be "Bob", and the name of the third callee 23 may be "Roger".

Peter 10 initiates a call 400 to Alice 21. When the call 400 arrives at Alice 21, the call message of the call 400 is enhanced with an identifier of Alice 21 and her mailbox address. These enhancement data may be added to the call message by encapsulating a XML script into the call message. The XML script may be as follows:

```
<forwardlist>
    <forward>
        <user>alice</user>
        <messagerie>alicebox</messagerie>
    </forward>
</forwardlist>
```

The enhanced call is forwarded by the call management system 31 of Alice 21 as a call 401 to Bob 22. When the call 401 arrives at Bob 22, the call message of the call 401 is enhanced with an identifier of Bob 22 and his mailbox address. In analogy to the case of Alice 21, these enhancement data may be added to the call message by encapsulating a XML script into the call message. The entire set of data added to the call as XML script may be as follows:

```
<forwardlist>
    <forward>
        <user>alice</user>
        <messagerie>alicebox</messagerie>
    </forward>
    <forward>
        <user>bob</user>
        <messagerie>bobbox</messagerie>
    </forward>
</forwardlist>
```

The enhanced call is forwarded by the call management system 32 of Bob 22 as a call 402 to Roger 23. When the call 402 arrives at Roger 23, the call message of the call 402 is enhanced with an identifier of Roger 23 and his mailbox address. The enhanced call is forwarded by the call management system 33 of Roger 23 as a call 403 to Roger's 23 message memory 230.

Figure 2A:
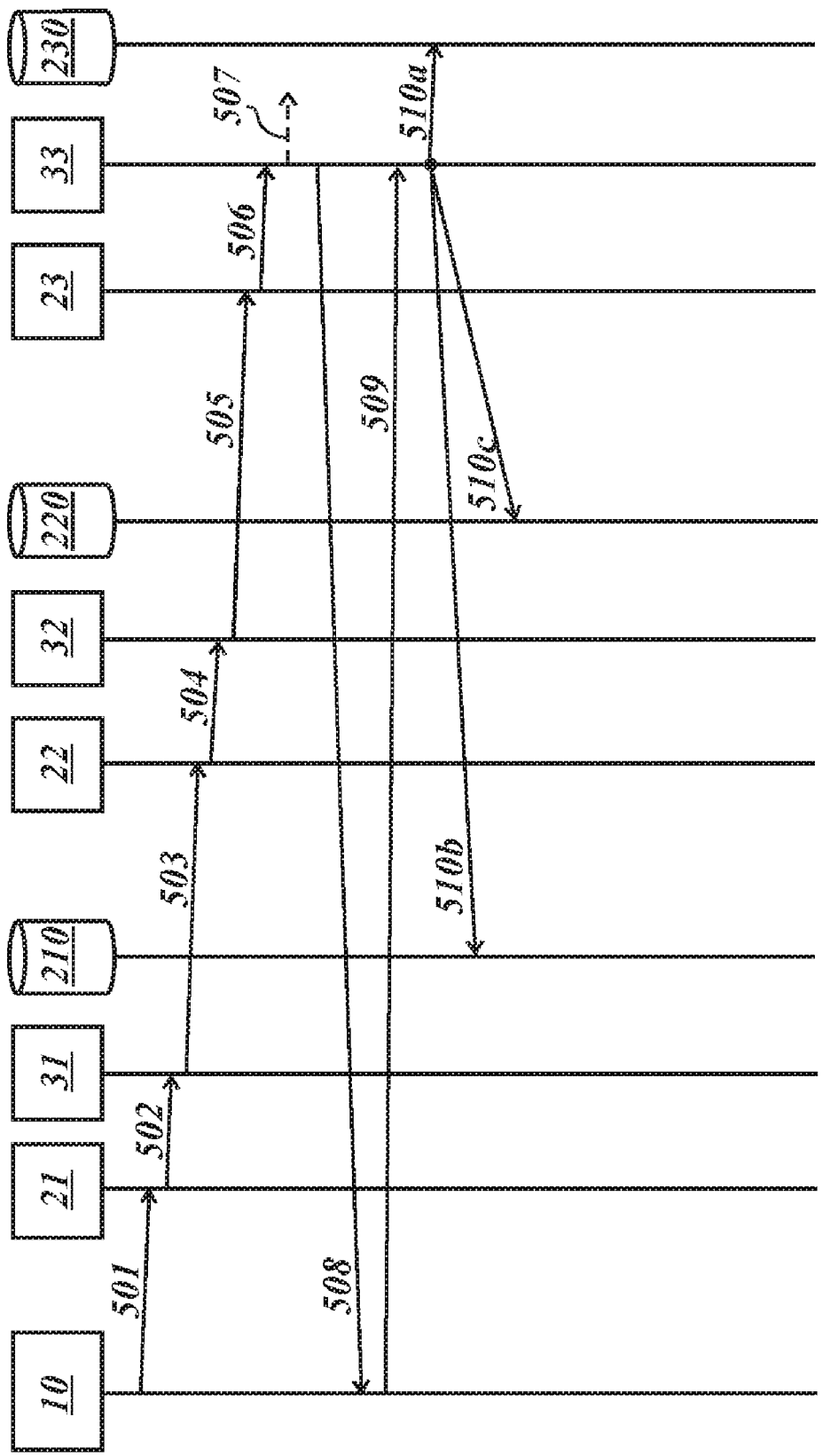
FIG. 2a is a message flow diagram according to a first embodiment of the invention.

FIG. 2a shows a message flow diagram of messages exchanged in a telecommunications system to perform a first embodiment of an improved call forwarding. The message flow diagram shown in FIG. 2a involves the caller Peter 10, the first callee Alice 21, the second callee Bob 22 and the third callee Roger 23, as described above with reference to FIG. 1. Furthermore, FIG. 2a shows the call management system 31 and the message memory 210 associated with Alice 21, the call management system 32 and the message memory 220 associated with Bob 22, and the call management system 33 and the message memory 230 associated with Roger 23.

Peter 10 calls Alice 21 by sending a call message 501 from his terminal to the terminal used by Alice 21. Alice 21 has activated a call forwarding service on her terminal, so the call 501 is transmitted 502 from the terminal to the associated call management system 31 for further processing. The call management system 31 adds a data set comprising an identifier of Alice 21 and an address of the message memory 210 to the call message and forwards the enhanced message 503 to the terminal used by Bob 22.

Bob 22 has activated a call forwarding service on his terminal, so the call 503 is transmitted 504 from his terminal to the associated call management system 32 for further processing. The call management system 32 adds an identifier of Bob 22 and an address of the message memory 220 to the data set appended to the call message and forwards the enhanced message 505 to the terminal used by Roger 23.

Roger 23 has activated a call forwarding to his mailbox on his terminal, so the call 505 is transmitted 506 from his terminal to the associated call management system 33 for further processing. The call management system 33 adds an identifier of Roger 23 and an address of the message memory 230 to the data set appended to the call message.

Possibly, the call management system 33 forwards the enhanced message 507 to the message memory 230 associated with the terminal used by Roger 23.

Upon receipt of the message 506, the call management system 33 analyses the received message 506 and determines from the added data set that the call 506 is related to a call forwarding chain. The call management system 33 extracts the identifiers contained in the data set, i.e., the identifiers of Alice 21, Bob 22 and Roger 23. The call management system 33 further extracts the addresses of the message memories 210, 220, 230 associated with the identified callees 21, 22, 23. Then the call management system 33 sends a message 508 to the caller 10, i.e., to Peter, to prompt Peter 10 to provide a message to be delivered to the message memories 210, 220, 230 of the identified callees 21, 22, 23.

Peter 10 speaks a message in his terminal, and the message is transmitted 509 to the call management system 33 of Roger 23. The call management system 33 sends 510a, b, c the received message of Peter 10 to the message memories 210, 220, 230 of the identified callees 21, 22, 23. This is possible since the call management system 33 has extracted the addresses of the message memories 210, 220, 230 from the received message 506. The callees 21, 22, 23 can access the respective message memories 210, 220, 230 and listen to the message of Peter 10.

Figure 2B:
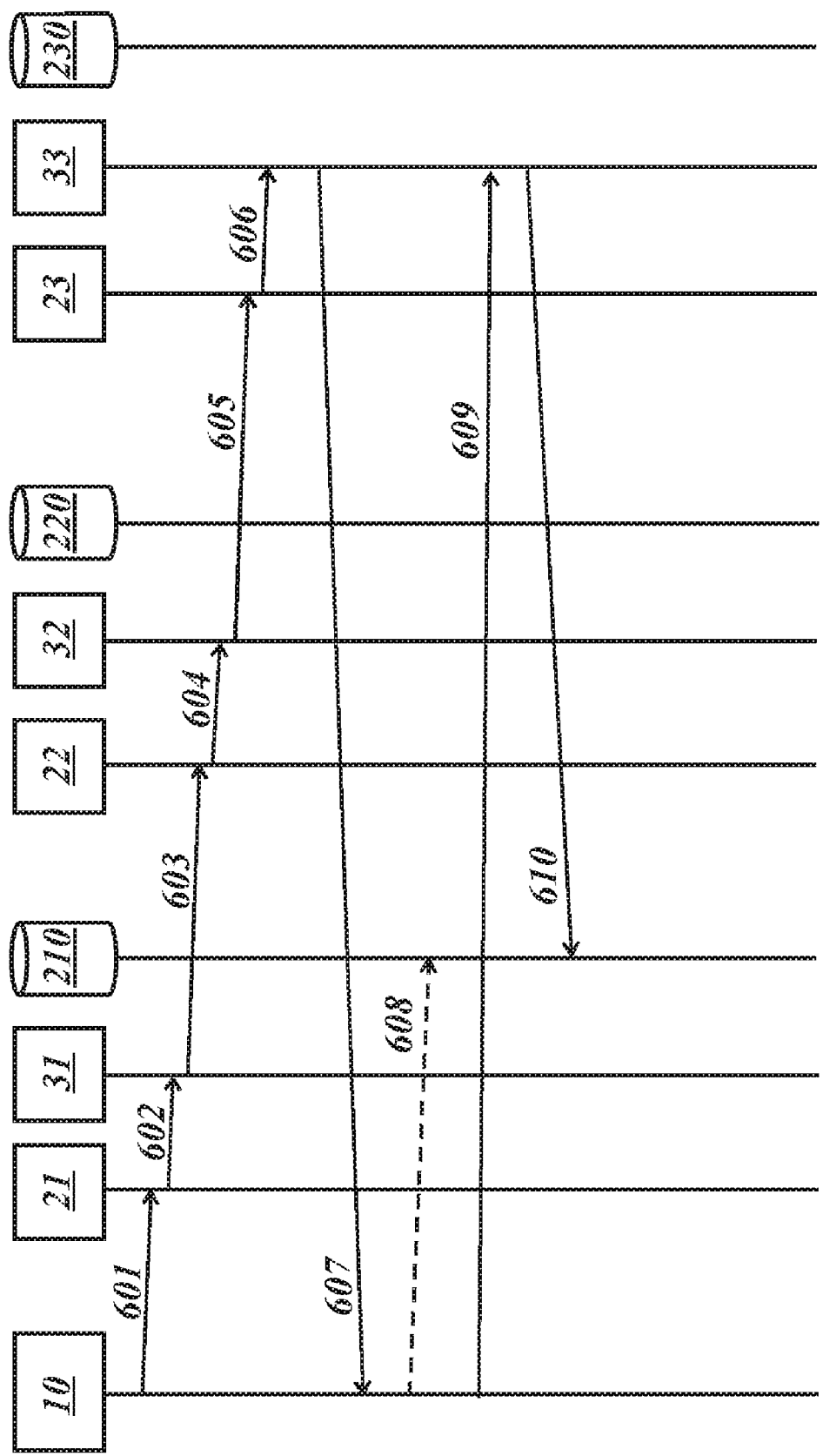
FIG. 2b is a message flow diagram according to another embodiment of the invention.

FIG. 2b shows a message flow diagram of messages exchanged in a telecommunications system to perform a second embodiment of an improved call forwarding. The message flow diagram involves the same entities as the message flow diagram shown in FIG. 2a.

The messages 601 to 606 shown in FIG. 2b are identical to the messages 501 to 506 shown in FIG. 2a. In addition, however, Alice 21 has provided to the call management system 31 a preference regarding the handling of calls. Alice 21 selects that a call destined to her must not be distributed to message memories associated with other subscribers of the network. Instead, a call destined to her must be sent to her message memory if the call is to be sent to a message memory at the end of a call forwarding chain. This preference provided by Alice 21 is also appended to the data set of the call 602 by the call management system 31.

Upon receipt of the message 606, the call management system 33 analyses the received message 606 and determines from the added data set that the call 606 is related to a call forwarding chain. The call management system 33 extracts the identifiers contained in the data set, i.e., the identifiers of Alice 21, Bob 22 and Roger 23. The call management system 33 further extracts the addresses of the message memories 210, 220, 230 associated with the identified callees 21, 22, 23.

The call management system 33 also checks if the received message 606 comprises data concerning a preference of a callee. In the present case, the call management system 33 detects that the message 606 comprises a preference provided by Alice 21. Accordingly, the call management system 33 does not forward the call to the message memory 230 of Roger 23. The call management system 33 sends a message 607 to the caller 10, i.e., to Peter, to prompt Peter 10 to provide a message to be delivered to the message memory 210 of Alice 21.

Peter 10 speaks a message in his terminal. According to a first alternative, the message is transmitted 608 directly to the message memory 210 of Alice 21 (e.g., by means of a re-routing mechanism). According to another alternative, the message is first transmitted 609 to the call management system 33 of Roger 23. The call management system 33 sends 610 the received message of Peter 10 to the message memory 210 of Alice 21. This is possible since the call management system 33 has extracted the address of the message memory 210 from the received message 606. Alice 21 can access her message memory 210 and listen to the message of Peter 10.

Figure 2C:
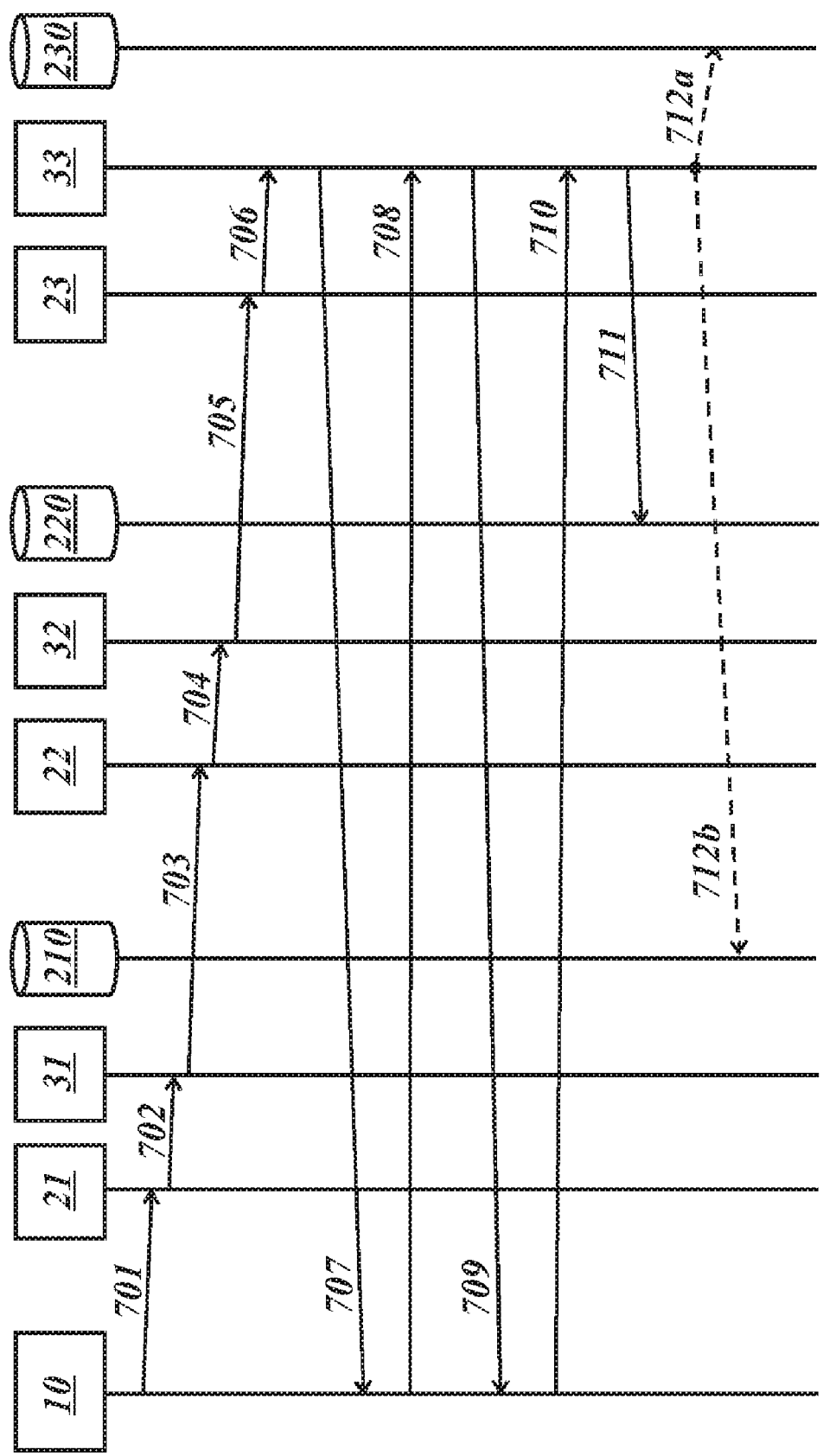
FIG. 2c is a message flow diagram according to still another embodiment of the invention.

FIG. 2c shows a message flow diagram of messages exchanged in a telecommunications system to perform a third embodiment of an improved call forwarding. The message flow diagram involves the same entities as the message flow diagram shown in FIG. 2a and FIG. 2b.

The messages 701 to 706 shown in FIG. 2b are identical to the messages 701 to 706 shown in FIG. 2a.

Upon receipt of the message 706, the call management system 33 analyses the received message 606 and determines from the added data set that the call 606 is related to a call forwarding chain. The call management system 33 extracts the identifiers contained in the data set, i.e., the identifiers of Alice 21, Bob 22 and Roger 23. The call management system 33 further extracts the addresses of the message memories 210, 220, 230 associated with the identified callees 21, 22, 23.

Triggered by the determination that the call 606 is related to a call forwarding chain, the call management system 33 sends a message 707 to the caller 10. The message 707 comprises a selection procedure which is presented to Peter 10. For example, a voice message is re-played to Peter 10, saying:

Do you want to leave a message at
1—Alice
2—Bob
3—Roger
4—Alice & Bob
5—Alice & Roger
6—Bob & Roger
7—all Peter 10 may select one entry of the select list by pressing a corresponding number on his terminal or by speaking the corresponding number. Let us assume that he chooses selection 2, i.e., Peter 10 wishes that his message be delivered to Bob 22 only. Peter's 10 selection is transmitted 708 to the call management system 33. Accordingly, the call management system 33 generates a prompt such as You may leave a message to Bob. Please speak after the signal.

This prompt is provided 709 to Peter 10. Peter 10 speaks a message in his terminal. The message is transmitted 710 to the call management system 33 of Roger 23. The call management system 33 sends 711 the received message of Peter 10 to the message memory 220 of Bob 22. This is possible since the call management system 33 has extracted the address of the message memory 220 from the received message 706. Bob 22 can access his message memory 220 and listen to the message of Peter 10.

Additionally, it is possible that the caller 10 chooses that a notification is left in the message memories 210, 230 where Peter's 10 message has not been sent. The notification may indicate that a new message has been delivered. Then, the call management system 33 generates a corresponding notification and sends 712*a*, *b* the generated notification to the message memory 210 of Alice 21 and the message memory 23 of Roger 23.

There may be also an option that the call management system 33 does not request the caller 10 to select a delivery, but that the message is systematically delivered to all message memories 210, 220, 230 involved in the call, i.e., to the message memories of Alice 21, Bob 22, and Roger 23.

The invention claimed is:

1. A method of providing an improved call forwarding service in a telecommunications network, wherein a call initiated by a caller to a first callee is consecutively forwarded, starting from the first callee, to one or more further interlinked callees, thereby forming a call forwarding chain, wherein the method comprises the steps of:
 adding a set of data to the call, the data comprising an identifier of each of the callees involved in the call forwarding chain and an address associated with a respective message memory assigned to each of the callees involved in the call forwarding chain;
 when the call is forwarded to the message memory assigned to a last callee of the call forwarding chain, prompting the caller to provide a message to be stored in one or more of the message memories;
 retrieving from the set of data one or more of the addresses associated with the message memories; and
 delivering the message received from the caller to one or more of the message memories by routing the message to the retrieved one or more addresses.

2. The method of claim 1,
 wherein the method comprises the further steps of:
 receiving an input from the first callee, the input concerning an instruction with respect to the handling of the call;
 storing the received input as preference data associated with the first callee;
 supplementing the set of data added to the call with the stored preference data;
 when the call is forwarded to the message memory assigned to said last callee, checking the set of data for the existence of preference data; and
 adapting the handling of the call in accordance with the preference data.

3. The method of claim 2,
 wherein the method comprises the further steps of:
 receiving the input from the first callee, the input specifying that the message provided by the caller is stored in the message memory assigned to the first callee without being distributed to any of the one or more further callees or to any message memory assigned to the one or more further callees;
 when the call is forwarded to the message memory assigned to said last callee, instructing the caller to provide a message to be stored in the message memory assigned to the first callee;
 retrieving from the data set the address associated with the message memory assigned to the first callee; and
 routing the message received from the caller to the message memory assigned to the first callee.

4. The method of claim 1,
 wherein the method comprises the further steps of:
 executing a selection procedure for selection of one or more of the one or more callees, whereby a select list presented in the selection procedure comprises the identifiers of each of the callees involved in the call forwarding chain;
 receiving from the caller a selection comprising one or more selected callees of the one or more callees involved in the call forwarding chain;
 retrieving from the data set the addresses associated with the message memories assigned to the selected one or more callees; and
 delivering the message received from the caller to the one or more message memories assigned to the selected one or more callees by utilizing the retrieved addresses.

5. The method of claim 1,
 wherein the method comprises the further step of:
 delivering a notification to the one or more of the message memories the message has not been delivered to, whereby the notification indicates that the message has been delivered.

6. The method of claim 5,
 wherein the method comprises the further step of:
 delivering the notification based on the VPIM or the IMAP.

7. The method of claim 1,
 wherein the method comprises the further steps of:
 retrieving from the data set all the addresses associated with the message memories; and
 delivering the message received from the caller to all the message memories by routing the message to all the retrieved addresses.

8. The method of claim 1,
 wherein the method comprises the further step of:
 adding the data set to the call by encapsulating an Extensible Mark-up Language script containing an identifier of each of the callees involved in the call forwarding chain and an address associated with a respective message memory assigned to each of the callees involved in the forwarding chain.

9. A network entity for providing an improved call forwarding service in a telecommunications network, wherein a call initiated by a caller to a first callee is consecutively forwarded, starting from the first callee, to one or more further interlinked callees, thereby forming a call forwarding chain, wherein the network entity comprises a control unit adapted to add a data set to the call, the data comprising an identifier of each of the callees involved in the call forwarding chain and an address associated with a respective message memory assigned to each of the callees involved in the call forwarding chain, prompt, when the call is forwarded to the message memory assigned to a last callee of the call forwarding chain, the caller to provide a message to be stored in one or more of the message memories, retrieve from the data set one or more of the addresses associated with the message memories, and deliver the message received from the caller to one or more of the message memories by routing the message to the retrieved one or more addresses.

10. A computer program product, stored on a storage medium, providing an improved call forwarding service in a telecommunications network, wherein a call initiated by a caller to a first callee is consecutively forwarded, starting from the first callee, to one or more further interlinked callees, thereby forming a call forwarding chain,
 wherein the computer program product, when executed by a network entity, performs the steps of:

adding a set of data to the call, the data comprising an identifier of each of the callees involved in the call forwarding chain and an address associated with a respective message memory assigned to each of the callees involved in the call forwarding chain;

when the call is forwarded to the message memory assigned to a last callee of the call forwarding chain, prompting the caller to provide a message to be stored in one or more of the message memories;

retrieving from the set of data one or more of the addresses associated with the message memories; and delivering the message received from the caller to one or more of the message memories by routing the message to the retrieved one or more addresses.

11. The network entity of claim 9,
wherein the control unit:
receives an input from the first callee, the input concerning an instruction with respect to the handling of the call;
stores the received input as preference data associated with the first callee;
supplements the set of data added to the call with the stored preference data;
when the call is forwarded to the message memory assigned to said last callee, checks the set of data for the existence of preference data;
adapts the handling of the call in accordance with the preference data;
receives the input from the first callee, the input specifying that the message provided by the caller is stored in the message memory assigned to the first callee without being distributed to any of the one or more further callees or to any message memory assigned to the one or more further callees;
when the call is forwarded to the message memory assigned to said last callee, instructs the caller to provide a message to be stored in the message memory assigned to the first callee;
retrieves from the data set the address associated with the message memory assigned to the first callee; and
routes the message received from the caller to the message memory assigned to the first callee.

12. The network entity of claim 9,
wherein the control unit:
executes a selection procedure for selection of one or more of the one or more callees, whereby a select list presented in the selection procedure comprises the identifiers of each of the callees involved in the call forwarding chain;
receives from the caller a selection comprising one or more selected callees of the one or more callees involved in the call forwarding chain;
retrieves from the data set the addresses associated with the message memories assigned to the selected one or more callees; and
delivers the message received from the caller to the one or more message memories assigned to the selected one or more callees by utilizing the retrieved addresses.

13. The network entity of claim 9,
wherein the control unit:
delivers a notification to the one or more of the message memories the message has not been delivered to, whereby the notification indicates that the message has been delivered; and
delivers the notification based on the VPIM or the IMAP.

14. The network entity of claim 9,
wherein the control unit:
retrieves from the data set all the addresses associated with the message memories; and
delivers the message received from the caller to all the message memories by routing the message to all the retrieved addresses.

15. The network entity of claim 9,
wherein the control unit:
adds the data set to the call by encapsulating an Extensible Mark-up Language script containing an identifier of each of the callees involved in the call forwarding chain and an address associated with a respective message memory assigned to each of the callees involved in the forwarding chain.

16. The computer program product of claim 10,
wherein the computer program product further performs the steps of:
receiving an input from the first callee, the input concerning an instruction with respect to the handling of the call;
storing the received input as preference data associated with the first callee;
supplementing the set of data added to the call with the stored preference data;
when the call is forwarded to the message memory assigned to said last callee, checking the set of data for the existence of preference data;
adapting the handling of the call in accordance with the preference data;
receiving the input from the first callee, the input specifying that the message provided by the caller is stored in the message memory assigned to the first callee without being distributed to any of the one or more further callees or to any message memory assigned to the one or more further callees;
when the call is forwarded to the message memory assigned to said last callee, instructing the caller to provide a message to be stored in the message memory assigned to the first callee;
retrieving from the data set the address associated with the message memory assigned to the first callee; and
routing the message received from the caller to the message memory assigned to the first callee.

17. The computer program product of claim 10,
wherein the computer program product further performs the steps of:
executing a selection procedure for selection of one or more of the one or more callees, whereby a select list presented in the selection procedure comprises the identifiers of each of the callees involved in the call forwarding chain;
receiving from the caller a selection comprising one or more selected callees of the one or more callees involved in the call forwarding chain;
retrieving from the data set the addresses associated with the message memories assigned to the selected one or more callees; and
delivering the message received from the caller to the one or more message memories assigned to the selected one or more callees by utilizing the retrieved addresses.

18. The computer program product of claim 10,
wherein the computer program product further performs the steps of:
delivering a notification to the one or more of the message memories the message has not been delivered to, whereby the notification indicates that the message has been delivered; and delivering the notification based on the VPIM or the IMAP.

19. The computer program product of claim 10, wherein the computer program product further performs the steps of:

retrieving from the data set all the addresses associated with the message memories; and delivering the message received from the caller to all the message memories by routing the message to all the retrieved addresses.

20. The computer program product of claim 10, wherein the computer program product further performs the step of:

adding the data set to the call by encapsulating an Extensible Mark-up Language script containing an identifier of each of the callees involved in the call forwarding chain and an address associated with a respective message memory assigned to each of the callees involved in the forwarding chain.

* * * * *